United States Patent
Jeromin

(10) Patent No.: US 11,082,685 B2
(45) Date of Patent: Aug. 3, 2021

(54) HEAD-MOUNTED DEVICE FOR DISPLAYING PROJECTED IMAGES

(71) Applicant: Universal City Studios LLC, Universal City, CA (US)

(72) Inventor: Aaron Chandler Jeromin, Winter Garden, FL (US)

(73) Assignee: Universal City Studios LLC, Universal City, CA (US)

(*) Notice: Subject to any disclaimer, the term of this patent is extended or adjusted under 35 U.S.C. 154(b) by 0 days.

(21) Appl. No.: 16/791,512

(22) Filed: Feb. 14, 2020

(65) Prior Publication Data

US 2021/0136352 A1    May 6, 2021

Related U.S. Application Data

(60) Provisional application No. 62/930,873, filed on Nov. 5, 2019.

(51) Int. Cl.
| H04N 13/04 | (2006.01) |
| H04N 15/00 | (2006.01) |
| H04N 13/332 | (2018.01) |
| H04N 13/373 | (2018.01) |

(52) U.S. Cl.
CPC ......... *H04N 13/332* (2018.05); *H04N 13/373* (2018.05)

(58) Field of Classification Search
CPC ........................... H04N 13/332; H04N 13/373
USPC ............... 348/53; 345/7, 419, 633; 701/535
See application file for complete search history.

(56) References Cited

U.S. PATENT DOCUMENTS

| 3,552,822 A | 1/1971 | Altman |
| 6,353,422 B1 | 3/2002 | Perlman |
| 8,282,222 B2 | 10/2012 | Smits |
| 8,353,598 B2 | 1/2013 | Estevez et al. |
| 2002/0149545 A1* | 10/2002 | Hanayama ........... G02B 27/017 345/7 |
| 2006/0293838 A1* | 12/2006 | Yamamoto ............. G09B 19/00 701/532 |

(Continued)

FOREIGN PATENT DOCUMENTS

WO    2019181482 A1    9/2019

OTHER PUBLICATIONS

PCT/US2020/056800 International Search Report and Written Opinion dated Jan. 21, 2021.

*Primary Examiner* — Jayanti K Patel
*Assistant Examiner* — Richard B Carter
(74) *Attorney, Agent, or Firm* — Fletcher Yoder P.C.

(57) ABSTRACT

A system includes a projection device configured to project images onto a receiver surface of a viewing device. The viewing device includes a screen having the receiver surface and a viewing surface opposite the receiver surface. The screen is configured to permit transmission of the images through the screen, from the receiver surface, to the viewing surface such that the images are viewable on the viewing surface. The viewing device also includes a focusing lens configured to focus the images for a user when wearing the viewing device. Further, the system includes a tracking system configured to determine a location and orientation of the receiver surface of the viewing device. The projection device is configured to adjust image properties of the images based at least in part on the determined location and orientation of the receiver surface.

18 Claims, 6 Drawing Sheets

(56) References Cited

U.S. PATENT DOCUMENTS

| | | |
|---|---|---|
| 2008/0206720 A1 | 8/2008 | Nelson |
| 2014/0225915 A1* | 8/2014 | Theimer .............. G02B 27/017 |
| | | 345/633 |
| 2016/0063767 A1* | 3/2016 | Lee ....................... G06T 19/006 |
| | | 345/419 |
| 2018/0088682 A1* | 3/2018 | Tsang ................... G02B 27/017 |
| 2019/0155031 A1 | 5/2019 | Dausmann |

* cited by examiner

HEAD-MOUNTED DEVICE FOR DISPLAYING PROJECTED IMAGES

CROSS-REFERENCE TO RELATED APPLICATIONS

The present application claims the benefit of U.S. Provisional Application No. 62/930,873, entitled "HEAD-MOUNTED DEVICE FOR DISPLAYING PROJECTED IMAGES" and filed Nov. 5, 2019, the disclosure of which is incorporated herein by reference for all purposes.

BACKGROUND

The present disclosure relates generally to the field of amusement parks. Specifically, embodiments of the present disclosure are related to a head-mounted device for displaying projected images for a user wearing the head-mounted device.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Theme park or amusement park attractions have become increasingly popular, and various amusement park attractions have been created to provide guests, both domestic and foreign, with unique immersive experiences. Certain amusement park attractions incorporate virtual reality devices to help provide the guests with the unique immersive experiences. Traditionally, providing images (e.g., video feed) to the guests for a virtual reality experience requires a head-mounted display (HMD) with onboard electronics to generate the images and power a display of the HMD. However, these HMDs are generally expensive, power hungry, and heavy, which may detract from the unique immersive experience. Additionally, some head-mounted displays include onboard cameras to determine a location or orientation of the head-mounted display. The onboard cameras may increase the cost, power consumption, and weight of traditional HMDs, which may further detract from the unique immersive experience. Accordingly, it is now recognizable that it is desirable to improve these head-mounted displays.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes a projection device configured to project one or more images onto a receiver surface. The system also includes a viewing device configured to be worn by a user. The viewing device has a frame holding a screen and a focusing lens. The screen of the viewing device has the receiver surface and a viewing surface opposite the receiver surface. The screen is configured to permit transmission of the one or more images through the screen from the receiver surface to the viewing surface such that the one or more images are viewable on the viewing surface. The focusing lens of the viewing device is configured to focus the one or more images viewable on the viewing surface for the user when wearing the viewing device. Moreover, the system includes a tracking system configured to determine a location and orientation of the receiver surface of the viewing device. The projection device is configured to adjust image properties of the one or more projected images based at least in part on the determined location and orientation of the receiver surface.

In accordance with an embodiment, a system includes a control system configured to generate image projection instructions based at least in part on a location and an orientation of a receiver surface. The system also includes a plurality of projection devices. Each projection device of the plurality of projection devices is configured to project a unique image onto at least a portion of a receiver surface based on the image projection instructions. Additionally, the system includes a viewing device configured to be worn by a user and has a frame holding a screen and a focusing lens. The viewing device includes the screen having the receiver surface and the viewing surface. The screen is configured to permit transmission of a blended image from the receiver surface, through the screen, to the viewing surface such that the blended image is viewable on the viewing surface. The blended image is formed from the unique images projected onto the receiver surface from the plurality of projection devices. The viewing device also includes the focusing lens configured to focus the blended image for the user associated with the viewing device. Moreover, the system includes a tracking system configured to determine a location and an orientation of the receiver surface. The plurality of projection devices are configured to adjust respective image properties of the unique images based at least in part on the image projection instructions to form the blended image.

In accordance with an embodiment, a method includes a step of determining a location and orientation of a viewing device via a tracking system. The viewing device is configured to be worn by a user and comprises a frame configured to hold a screen and a focusing lens. The method further includes the step of adjusting image properties of one or more images based at least in part on the location and orientation of the viewing device. Moreover, the method includes the step of projecting the one or more images, via one or more projection devices, onto a receiver surface of the screen of the viewing device. A viewing surface of the screen is disposed opposite the receiver surface, and the screen is configured to permit transmission of the one or more images through the screen from the receiver surface to the viewing surface such that the one or more images are viewable for the user on the viewing surface through the focusing lens.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Provided herein is a system and method for displaying images (e.g., a video feed) to a user without involving the hardware and processing circuitry of a traditional head-mounted display. The system and method includes a separate projection device configured to project the images onto a viewing device (e.g., glasses) configured to be worn by the user. Specifically, the projection device projects the images onto a receiver surface of a screen of the viewing device. The screen includes the receiver surface and a viewing surface, and the screen is configured to permit transmission of the images from the receiver surface to the viewing surface. That is, the screen includes rear projection material that allows the images to pass from the receiver surface to the viewing surface. The viewing device also includes focusing lenses to focus the images for the user wearing the viewing device, such that the user may view the images on the viewing surface. Accordingly, a computationally complex image generation and/or projection is offloaded to the projection device instead of being resident on the viewing device worn by the users. As onboard electronics are not required to display the images, the system and method provides a low cost, comfortable, and power-conserving option for displaying images to users.

Figure 1:
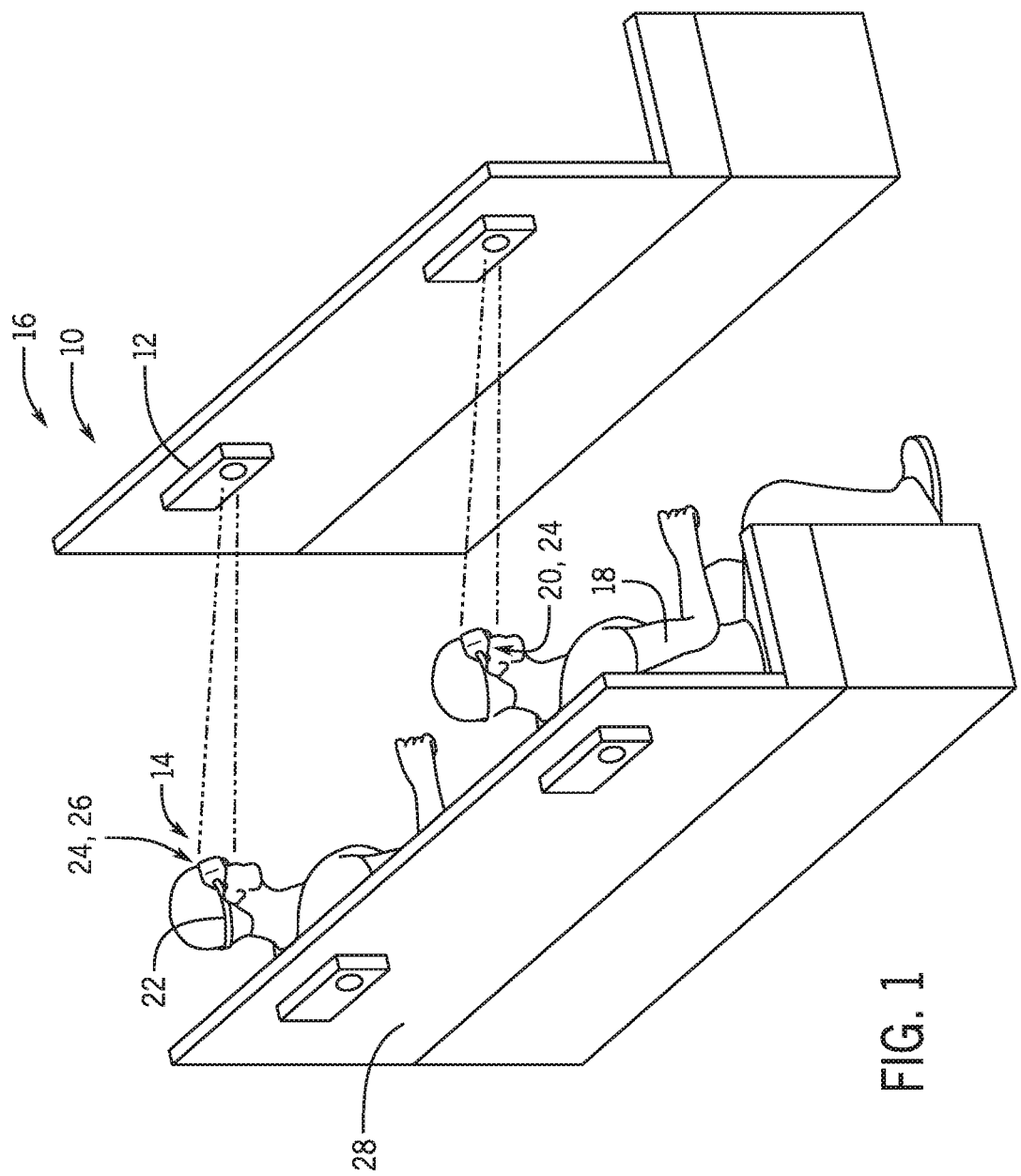
FIG. 1 is a perspective view of an embodiment of a projection system for displaying projected images, in accordance with an aspect of the present disclosure.

FIG. 1 is a perspective view of an embodiment of a projection system 10 having a projection device 12 and a viewing device 14 in an amusement park attraction 16. As set forth above, the projection device 12 may be spaced apart from and configured to project images onto the viewing device (e.g., glasses) such that a user 18 may view the images (e.g., video feed) on a viewing surface 20 of the viewing device 14. In the illustrated embodiment, each user 18 in the amusement park attraction 16 has a respective viewing device 14 to view the images. The projection system may be configured to output the same images to each viewing device 14, such that a common video feed is viewable for each user 18. However, in some embodiments, the images may be user or device specific images such that each user 18 may view unique images (e.g., unique video feed) via the respective viewing device 14. For example, each user may be assigned a specific role (e.g., captain, pilot, navigator, etc.) as part of the amusement park attraction 16. The respective viewing device 14 of each user 18 may receive a unique video feed specific to the specific role assigned to the user 18 such that the user 18 may experience the amusement park attraction 16 from a perspective of their assigned role. To output unique video feeds, the projection system may have multiple projection devices 12 (e.g., dedicated projection devices). The projection system may have a dedicated projection device 12 for each user 18 or viewing device 14 in the amusement park attraction 16. In some embodiments, a single projection device may output the common feed or unique video feeds to more than one viewing device 14.

In some embodiments, the projection system 10 may be configured to output a combination of both the common feed and unique video feeds within the amusement park attraction 16. For example, the projection system 10 may output the common feed during an introductory portion of the amusement park attraction 16. During later portions of the amusement park attraction 16, the projection system 10 may cause some projection devices 12 to output unique video feeds to users 18 with specific roles. The users 18 without roles or users 18 with roles that do not have active tasks may continue to receive the common feed. However, during some portions of the amusement park attraction 16, the projection system 10 may output unique video feeds to each user 18 of the amusement park attraction 16.

As set forth above, the viewing device 14 is configured to be worn by the user 18. The viewing device 14 may be a head-mounted device (e.g., glasses). The viewing device 14 includes a frame 22 (e.g., glasses frame). Components of the viewing device 14 may be mounted to the frame 22. A screen 24 may be mounted to a portion of the frame 22 such that the viewing surface 20 of the screen 24 is viewable to the user 18. The screen 24 includes at least the viewing surface 20 and a receiver surface 26 disposed opposite the viewing surface 20. The viewing surface 20 may be disposed on an interior portion of the viewing device 14. That is, the viewing surface 20 may be disposed on a portion of the screen 24 facing the user 18 such that the viewing surface 20 is viewable to the user while the user 18 wears the viewing device 14. The receiver surface 26 faces outward from the user 18. In some embodiments, the amusement park attraction 16 is configured to orient users 18 such that the receiver surface 26 is oriented generally toward the projection device 12. For example, the amusement park attraction 16 may include a ride seat 28 for the user 18. The ride seat 28 may be oriented toward the projection device 12 to face the user 18 and the viewing device 14 toward the projection device 12.

The projection device 12 is configured to project the image (e.g., video feed) onto the receiver surface 26 of the screen 24 of the viewing device 14. The screen 24 may include a rear projection material. The rear projection material is at least partially translucent and permits transmission of the image (e.g., video feed) through the screen 24 from the receiver surface 26 to the viewing surface 20 such that the images are viewable on the viewing surface 20 to the user 18. Additionally, a rear image of the image (e.g., video feed) viewable by the user 18 may be viewable on the receiver surface 26. In some embodiments, amusement park personnel may perform a check to make sure that each user's viewing device 14 is displaying the image (e.g., video feed) correctly by visually inspecting the rear images viewable on a respective receiver surface 26 of the viewing device 14.

The viewing device 14 may also include a focusing lens configured to focus the image (e.g., video feed) viewable on the viewing surface such that the image is viewable to the user 18 wearing the viewing device 14. In some embodiments, the image includes a text-based message, a picture, a video, or some combination thereof. For example, the amusement park attraction 16 may be a virtual reality type attraction such that the images include video images of the virtual reality environment. In another example, the image may include text-based instructions for the amusement park attraction 16. The text-based instructions may inform the user on how to use the viewing device 14 to avoid losing the image projected from the projection device 12.

As set forth above, the projection device 12 is configured to project the images onto the receiver surface 26 of the viewing device 14. However, as the viewing device 14 is a head-mounted device, the viewing device 14 will move (e.g., change orientation) with respect to the projection device 12 when the user 18 moves their head. The user 18 may tilt or move their head in multiple directions causing the receiver surface 26 to move with respect to the projection device 12. Thus, the projection system 10 may include a tracking system 32 to detect movement of the receiver surface 26 and determine a location and an orientation of the receiver surface 26. Based on the detected movement of the receiver surface 26, the projection system 10 may be configured to adjust the image (e.g., correct the image output to the receiver surface). The projection system 10 may cause the projection device 12 to adjust the images to allow the user 18 to view a consistent image despite head movement of the user 18. In some embodiments, the projection system 10 may be configured to move or rotate the projection device 12 to follow the receiver surface 26 such that the user 18 views the consistent image despite head movement of the user 18.

However, if the user 18 moves their head to an orientation beyond the capabilities of the projection device 12 to adjust the image, the user 18 may lose the image such that the image is not viewable on the viewing surface 20. In some cases, the user 18 may turn their head (e.g., ninety (90) degrees to the right), such that the projection device 12 may not be able to project the image accurately to the viewing device 14.

Figure 2:
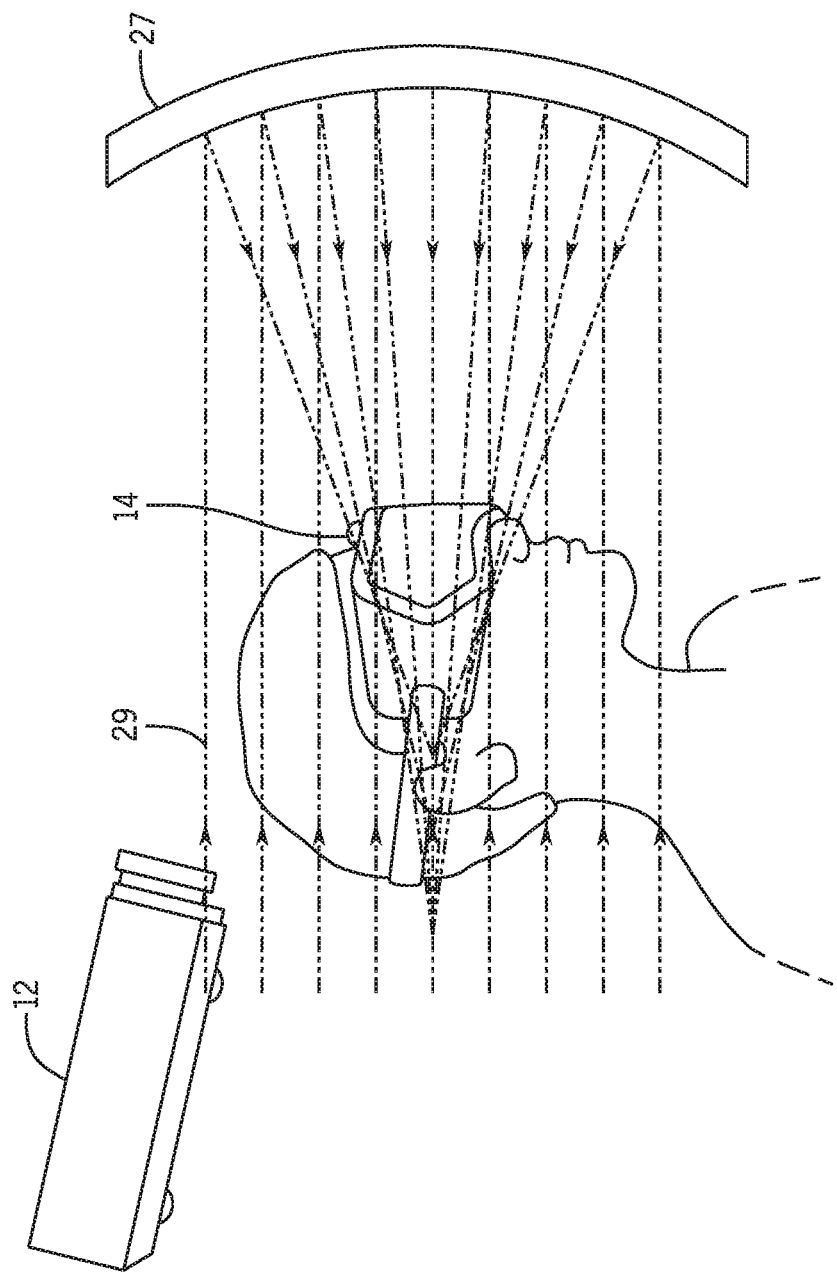
FIG. 2 is a perspective view of an embodiment of the projection system for displaying projected images, in accordance with an aspect of the present disclosure.

In some embodiments, as shown in FIG. 2, the projection system 10 includes a reflective surface 27 configured to increase a potential range of movement for the user of the amusement park attraction. The reflective surface 27 may be configured to reflect the images 29 projected from the projection device 12 onto the receiver surface 26 of the screen 24 of the viewing device 14. The projection device 12 may be positioned generally behind the user 18, which may also enhance an immersive experience of the embodiment. A threshold range of movement for the projection device 12 to project an accurate image onto the viewing device may be between −fifty (−50) to +fifty (+50) degrees. The reflective surface may be a concave mirror that permits the user to rotate within a dome surface of the mirror without losing the ability to receive reflected images. The reflective surface 27 is configured to reflect the image toward the receiver surface 26 of the viewing device 14, such that the user 18 may view the accurate image even at a ninety degree orientation. In some embodiments, other systems may compensate for user movement to orientations outside of the threshold range of movement for the projection device 12. For example, the projection system 10 may be configured to use multiple projection devices for a single viewing device 14.

Figure 3:
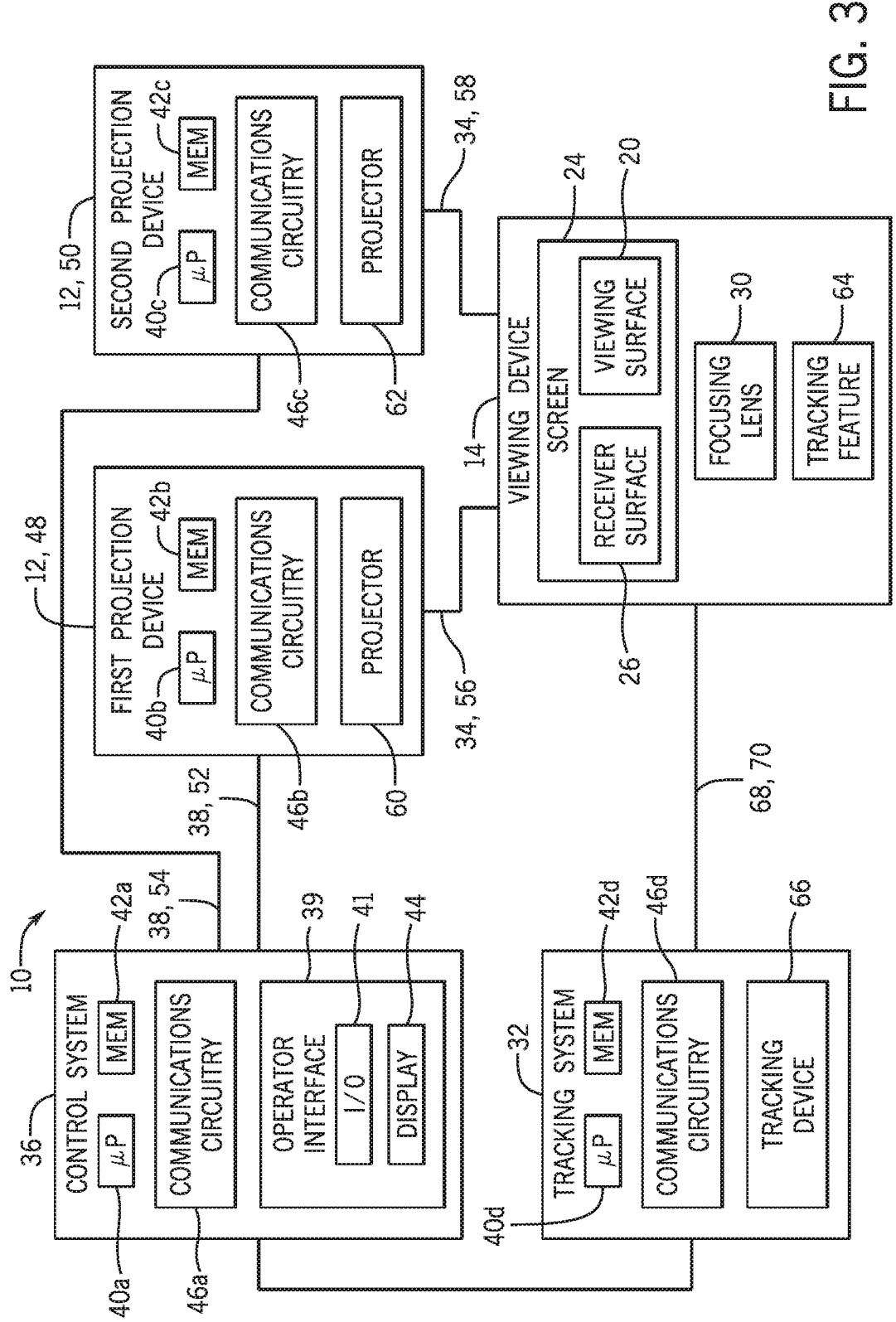
FIG. 3 is a block diagram of an embodiment of a control system of the projection system for displaying projected images on a viewing device, in accordance with an aspect of the present disclosure.

FIG. 3 is a block diagram of an embodiment of a control system 36 of the projection system 10 for displaying projected images on the viewing device 14 (e.g., head-mounted device), in accordance with an aspect of the present disclosure. As set forth above, the projection device 12 is configured to project the image 34 (e.g., video feed) toward the receiver surface 26 of the screen 24 of the viewing device 14. The control system 36 is configured to generate image projection instructions 38 for the projection device to output the projected image. The image projection instructions 38 may cause the projection device 12 to project an introduction video, for the amusement park attraction 16, to the receiver surface 26 of the viewing device 14. In another example, the projected image may include a unique message (e.g., warning, input coordinates now, or, turn right).

The control system 36 may be configured to generate the image projection instructions 38 via a processor 40a and a memory 42a. The processor 40a may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 40a or by other processor-based devices (e.g., mobile devices). In some embodiments, the memory 42a is configured to store controller instructions executable by the processor 40a to output various control system signals (e.g., image projection instructions 38). For example, the processor 40a may execute the controller instructions to output the image projection instructions 38 to activate the projection device 12.

In some embodiments, the processor 40a may be configured to generate the image projection instructions 38 based at least in part on user input via a user interface 39. The user interface 39 may include an input/output device 41 (e.g., keyboard, mouse, or touch screen) configured to provide the user input to the processor 40a. Further, the user interface 39 may include a display 44 (e.g., computer monitor or personal device screen) configured to display user options for the control system 36.

Moreover, the control system 36 may be configured to output the image projection instructions 38 via communications circuitry 46a. The communications circuitry 46a may include antennas, radio transceiver circuits, and signal processing hardware and/or software (e.g., hardware or software filters, A/D converters, multiplexers, amplifiers), or a combination thereof, and that may be configured to communicate over wireless communication paths via infrared (IR) wireless communication, satellite communication, broadcast radio, microwave radio, Bluetooth, Zigbee, Wifi, UHF, NFC, etc.

The projection device 12 is configured to receive the image projection instructions 38 and output the image 34 (e.g., video feed) based at least in part on the image projection instructions 38. In some embodiments, the control system 36 includes multiple projection devices (e.g., a first projection device 48 and a second projection device 50). Each projection device 12 may be configured to receive unique image projection instructions (e.g., first image projection instructions 52 and second image projection instructions 54) such that each projection device 12 outputs a unique image (e.g., first image 56 and second image 58). Thus, each projection device 12 may include communications circuitry 46b, 46c for receiving respective unique image projection instructions. The communications circuitry 46b, 46c may be configured to output respective received unique image projection instructions to respective processors 40b, 40c and/or memory devices 42b and 42c. The respective processors 40b, 40c may be configured to generate and output respective projector instructions based at least in part on the respective received image projection instructions. Respective projectors (e.g., first projector 60 and second projector 62) may be configured to receive the respective projector instructions and output respective images 56, 58.

In some embodiments, the projection devices 48, 50 are configured to project the respective images 56, 58 onto at least a portion of the receiver surface 26 of the viewing device 14. That is, multiple projection devices 12 may be configured to emit the respective images onto a single viewing device 14. In some embodiments, the projection devices 48, 50 are configured to output the respective images 56, 58 onto corresponding viewing devices such that the first projection device outputs the first image 56 onto a first viewing device and the second projection device outputs the second image 58 onto a second viewing device. In some embodiments, a single projection device 12 is configured to output the image 34 onto multiple receiver devices. The image 34 may be configured to display the common feed on each of the multiple receiver devices. For example, the image 34 may span a width of a room of the amusement park attraction. The image 34 may include multiple common feeds within the image 34. Each of the common feeds may be positioned in the image 34 based on the locations and orientations of the viewing devices in the room. That is, the projection device 12 may be configured to align each of the common feeds in the image 34 with the viewing devices such that the common feed is projected to each of the multiple viewing devices.

Moreover, the projection device 12 may be any suitable projection device 12 configured to project the image 34. For example, the projection device 12 may include a digital light processing (DLP) projector, a light emitting diode (LED) projector, or a liquid crystal display (LCD) projector.

In some embodiments, the viewing device 14 includes a head-mounted display. For example, the viewing device 14 may include glasses configured to be worn by the user. As set forth above, the viewing device 14 includes the screen 24. The screen 24 includes the receiver surface 26 and the viewing surface 20 opposite the receiver surface 26. The screen 24 is configured to permit transmission of the image 34 through the screen 24 from the receiver surface 26 to the viewing surface 20 such that the image 34 is viewable on the viewing surface 20. The viewing device 14 also includes the focusing lens 30 configured to focus the image 34 viewable on the viewing surface for the user associated with the viewing device 14.

As set forth above, the control system 36 may be configured to generate the image projection instructions 38 based at least in part on pre-programmed controller instructions stored in the memory 42a or based at least in part on user input. Additionally, the control system 36 may be configured to generate the image projection instructions 38 based at least in part on a location and an orientation of the screen 24 of the viewing device 14. As the distance and relative angle of the viewing device 14 change with respect to the projection device 12, the projection device 12 may be configured to alter the image 34 such that the image 34 (e.g., video stream) is displayed on the viewing device 14 correctly. For example, the user may initially be positioned five feet away from the projection device 12. During a portion of the amusement park attraction 16, the user may move backwards away from the projection device 12 such that the user is ten feet away from the projection device 12. Without the projection device 12 altering the image 34, the image 34 would appear larger than the viewing device 14 and only a portion of the image 34 would be viewable on the viewing device 14. As such, the projection device 12 may be configured to adjust image properties (e.g., focus, distortion, offset, or scale) of the image 34, based on the location and orientation of the viewing device 14, such that the image 34 is projected onto the viewing device 14 correctly.

The projection system 10 may include a tracking system 32 configured to determine the location and orientation of the receiver surface of the viewing device. The tracking system may include a processor 40d and a memory 42d. In some embodiments, the tracking system 32 is configured to detect a tracking feature 64 disposed on the viewing device 14 to determine the location and/or orientation of the viewing device 14. The tracking system 32 may include communications circuitry 46d configured to output the determined location and/or orientation of the viewing device 14 to the control system 36. The viewing device 14 may have a passive infrared tracking feature such as an infrared ink pattern, infrared LED illuminators, or another suitable passive tracking feature 64. The tracking system 32 may include a tracking device 66 (e.g., infrared tracking device) configured to detect the passive infrared tracking feature and determine the location and/or orientation of the viewing device 14 based at least in part on detection of the passive infrared tracking feature. The tracking device 66 may be mounted to the projection device 12 or in any suitable location that provides line of site to the tracking feature 64. For example, the tracking device 66 may be mounted to an upper portion of a wall of the amusement park attraction.

In some embodiments, the tracking system 32 has a camera configured to detect an optically visible tracking feature disposed on the viewing device 14. The optically visible tracking feature may include retroreflective dots, QR codes, optically visible ink patterns, or any other suitable tracking feature. The tracking system 32 may be configured to determine the location and/or orientation of the viewing device 14 based at least in part on the detected optically visible tracking feature. In some embodiments, the viewing device 14 comprises an infrared transceiver configured to output infrared location signals to the tracking system 32. The tracking system 32 may be configured to receive the infrared location signals 68 and determine the location and/or orientation of the viewing device 14 based at least in part on the infrared location signals 68. In some embodiments, the viewing device 14 comprises a global positioning system (GPS) device configured to output a GPS signal 70 to the tracking system 32. The tracking system 32 may be configured to determine the location of the viewing device based at least in part on the GPS signal 70.

Figure 4:
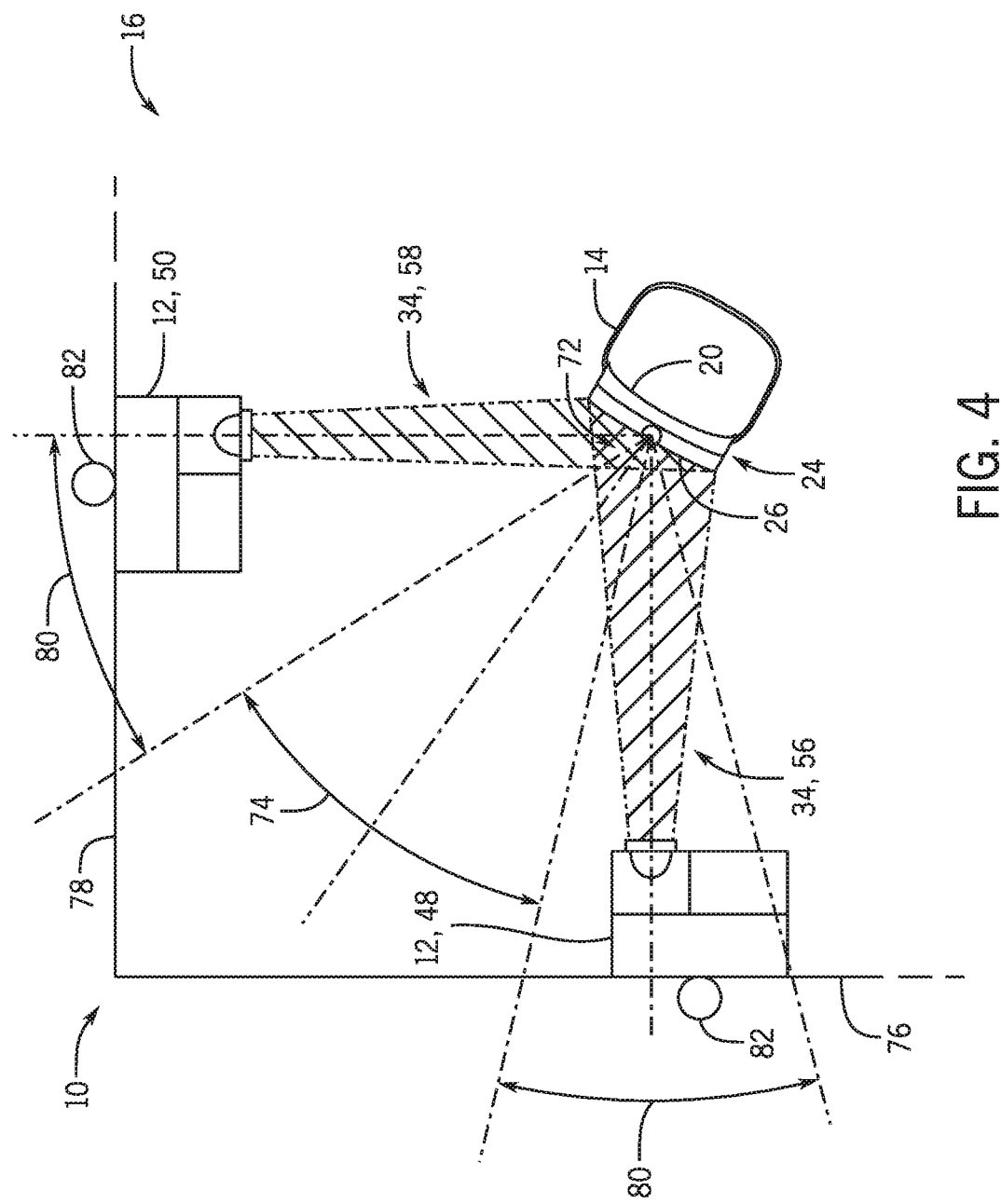
FIG. 4 is a perspective view of an embodiment having multiple projection devices simultaneously projecting images onto the viewing device, in accordance with an aspect of the present disclosure.

FIG. 4 is a top view of an embodiment of the projection system 10 in the amusement park attraction 16 having multiple projection devices simultaneously projecting images onto the viewing device 14, in accordance with an aspect of the present disclosure. In some embodiments, the projection system 10 includes multiple projection devices (e.g., the first projection device 48 and the second projection device 50). As set forth above, the multiple projection devices may be configured to emit the images onto a single viewing device 14. Specifically, each projection device 12 of the multiple of projection devices may be configured to emit respective unique images (e.g., the first image 56 and the second image 58) onto at least a portion of the receiver surface 26 of the viewing device 14. The viewing device 14 (e.g., glasses) is configured to be worn by the user and includes the frame 22 holding the screen 24 and the focusing lens.

The screen 24 includes the receiver surface 26 and the viewing surface 20. The receiver surface 26 is disposed on an opposite side of the screen 24 relative the viewing surface 20. The screen 24 may be at least partially translucent. The screen 24 may include the rear projection material configured to allow transmission of visible light through the screen 24. Specifically, the screen 24 is configured to permit transmission of the image 34 from the receiver surface 26, through the screen 24, and to the viewing surface 20, such that the image 34 is viewable on the viewing surface 20 of the screen 24. The viewing surface 20 is disposed on an inner portion of the viewing device 14. That is, the viewing surface 20 of the screen 24 is viewable by the user when the user is wearing the viewing device 14.

In some embodiments, the projection system 10 is configured to transmit the image (e.g., video feed) via a blended image 72. The blended image 72 is formed from a combination of unique images 56, 58 projected onto the receiver surface 26 from the multiple projection devices 48, 50. As set forth above, the viewing device 14 may have a threshold range 74 of movement relative to the projection device 12 that allows the projection device 12 to project an accurate image onto the viewing device 14. In some embodiments, the threshold range 74 may be between negative fifty (−50) degrees and positive fifty (+50) degrees. As the viewing device 14 moves relative the first projection device 48 (e.g., the user turns their head), the viewing device 14 may rotate such that the second projection device 50 is within the threshold range 74. For example, the first projection device 48 may be positioned at a front 76 of the room, and the second projection device may be positioned at a right wall 78 of the room. Each of the first projection device 48 and the second projection device 50 may be configured to project respective images (e.g., the first image 56 and the second image 58) toward a center of the room. The user may initially be oriented toward the front 76 of the room such that the first projection device 48 is within the threshold range 74 of the viewing device 14. However, the user may turn their head outside the threshold range (e.g., eighty (80) degrees to the right) such that the second projection device 50 rotates into the threshold range 74 of the viewing device 14.

In some embodiments, a quality loss zone 80 for the viewing device 12 is outside of the threshold range 74. For example, the quality loss zone 80 for the viewing device 14 may be between negative fifty (−50) degrees and negative seventy (−70) degrees, as well as between positive fifty (+50) degrees and positive seventy (+70) degrees. The projection device 12 may project a degraded image within the quality loss zone 80 of the viewing device 14. In some embodiments, the first projection device 48 and the second projection device 50 may project the respective images (e.g., the first image 56 and the second image 58) within the quality loss zone, forming the blended image 72. To project the accurate image onto the viewing device 14, each of the first projection device 48 and the second projection device 50 may be configured to emit a portion of the image 34 (e.g. video feed) via the respective unique images (e.g., the first image 56 and the second image 58). The combination of these unique images (e.g., the first image 56 and the second image 58) form the blended image. The screen 24 is configured to permit transmission of the blended image 72 from the receiver surface 26, through the screen 24, to the viewing surface 20 such that the blended image 72 is viewable on the viewing surface 20.

In some embodiments, the projection system 10 includes a projection device actuator. The projection device actuator 82 may be configured to move the projection device 12 based at least in part on the location and orientation of the viewing device 14. The projection device actuator 82 may be configured to rotate along multiple axes. Further, the projection device actuator 82 may be configured to move throughout the room of the amusement park attraction 16. For example, the projection device actuator 82 may be on a track system coupled to a ceiling such that the projection device actuator 82 may move the projection device 12 from the front 76 of the room to a back of the room. The projection device actuator 82 may be configured to move based at least in part on an actuator signal received from the control system of the projection system 10.

Figure 5:
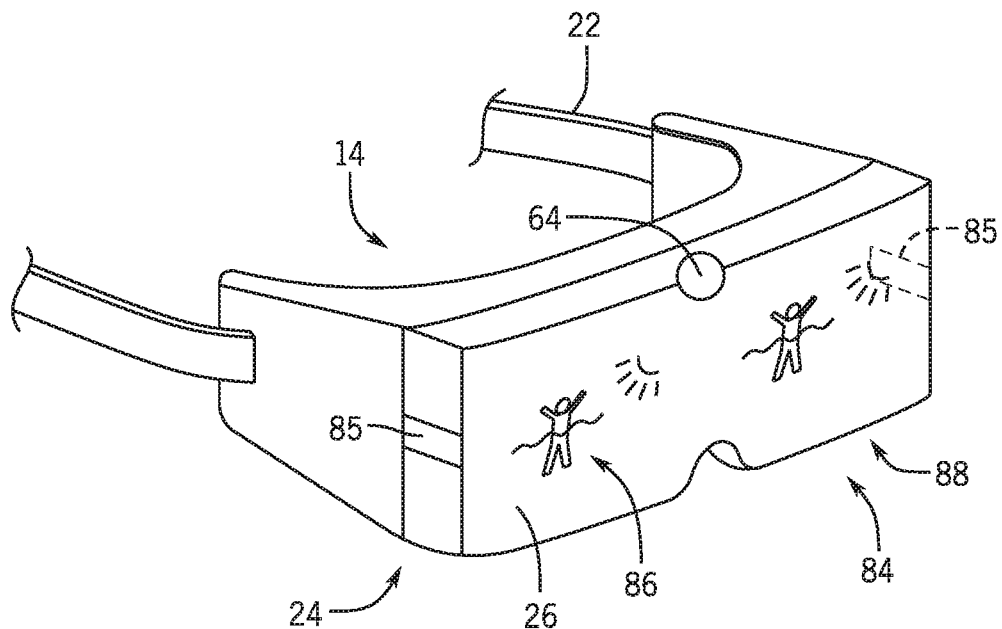
FIG. 5 is a perspective view of an embodiment of an exterior portion of the viewing device, in accordance with an aspect of the present disclosure.

FIG. 5 is a perspective view of an embodiment of an exterior portion 84 of the viewing device 14, in accordance with an aspect of the present disclosure. As set forth above, the viewing device 14 (e.g., glasses) is configured to be worn by the user. The viewing device 14 includes the frame 22 (e.g., glasses frame), and components of the viewing device 14 may be mounted to the frame 22. For example, the screen 24 may be mounted to a portion of the frame 22 via clips 85. The screen 24 may be an inexpensive disposable component that may be replaced when damaged or worn, and may be removed from the frame 22 as necessary. The screen 24 includes the receiver surface 26 and the viewing surface (not shown) opposing the receiver surface 26. The receiver surface 26 is a surface of the screen 24 facing outward with respect to the user.

The projection device is configured to project the image 34 (e.g., video feed) onto the receiver surface 26 of the screen of the viewing device. The screen may include the rear projection material. The rear projection material is at least partially translucent and permits transmission of the image (e.g., video feed) through the screen from the receiver surface 26 to the viewing surface such that the image is viewable on the viewing surface for the user. As set forth above, the rear image 86 of the image (e.g., video feed) may be viewable on the receiver surface 26. In some embodiments, amusement park personnel may perform a check to make sure that each of the user's viewing devices 14 are displaying the image (e.g., video feed) by visually inspecting the rear image 86 viewable on the receiver surface 26 of the viewing device 14 of the user.

In some embodiments, the viewing device 14 may have the tracking feature 64 configured to communicate (e.g., passively or actively) with the control system to provide the location and/or orientation of the receiver surface of the viewing device 14. The tracking feature 64 may be disposed on a front portion 88 of the viewing device 14. For example, the tracking feature 64 may be mounted to or disposed in or on the frame 22 at the front portion of the viewing device 14. In another example, the tracking feature 64 is coupled to the receiver surface 26 of the screen 24. However, the tracking feature 64 may be coupled to any suitable portion of the viewing device 14. Moreover, in some embodiments, the projection system 10 may include an external tracking feature. For example, the external tracking feature may be disposed on a wearable device (e.g., bracelet) corresponding to the user wearing the viewing device 14. The external tracking feature may be configured to provide a location of the user within the amusement park attraction.

The tracking feature 64 may be a passive infrared tracking feature such as an infrared ink pattern, infrared LED illuminators, or another suitable passive tracking feature. The tracking feature 64 may be configured to be detected by the tracking system to provide location and orientation information of the viewing device 14 to the control system. The tracking feature 64 may be mounted to a portion of the viewing device 14 that enables line of site to the passive infrared tracking feature of the tracking system. For example, the tracking feature 64 may be mounted to the front portion 88 of the viewing device 14, such that the tracking feature is in line of sight with the tracking system disposed proximate the projection device.

In some embodiments, the tracking feature 64 includes an optically visible tracking feature, such as a retroreflective marker, retroreflective dots, QR codes, optically visible ink patterns, or any other suitable tracking feature. The optically visible tracking feature may be positioned on a portion of the viewing device 14 visible to the camera of the tracking system. As set forth above, the camera of the tracking system is configured to detect the optically visible tracking feature disposed on the viewing device 14 to determine the location and orientation of the viewing device 14. In some embodiments, the viewing device 14 comprises an infrared transceiver configured to actively output infrared location signals to the tracking system. The tracking system may be configured to receive the infrared location signals and determine the location and orientation of the viewing device 14 based at least in part on the infrared location signals.

A passive tracking feature 64 on the viewing device 14 permits the tracking feature to be formed from relatively inexpensive materials such that the entire viewing device 14 may be generally disposable or provided as a collectible item. This feature provides a benefit over more costly head-mounted devices with integral image generation and processing circuitry. Collecting more expensive devices at the end of an experience is time-consuming, and the disclosed projection system 10 allows for the rapid distribution of the viewing devices 14 without requiring that the viewing devices 14 be collected after the experience.

Figure 6:
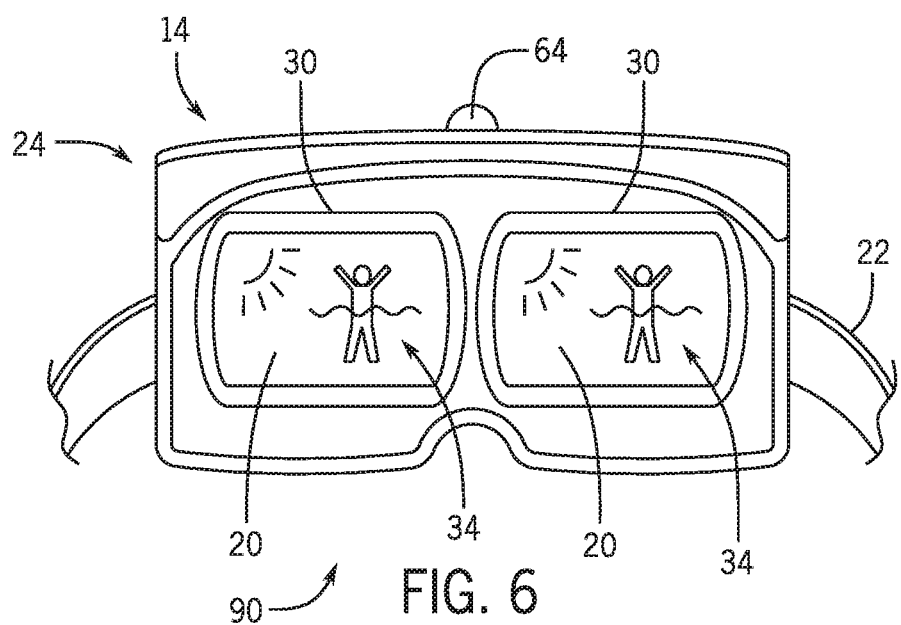
FIG. 6 is a perspective view of an embodiment of an interior portion of the viewing device, in accordance with an aspect of the present disclosure.

FIG. 6 is a perspective view of an embodiment of an interior portion 90 of the viewing device 14, in accordance with an aspect of the present disclosure. As set forth above, the viewing device 14 may be a head-mounted device (e.g., glasses). The viewing device 14 includes the frame 22 (e.g., glasses frame). Components of the viewing device 14 may be mounted to the frame 22. The screen 24 may be mounted to a portion of the frame 22 such that the viewing surface 20 of the screen 24 is viewable to the user. The screen 24 includes at least the viewing surface 20 and the receiver surface (not shown) disposed opposite the receiver surface. The viewing surface 20 may be disposed on the interior portion 90 of the viewing device 14. That is, the viewing surface 20 may be disposed on a portion of the screen facing the user such that the viewing surface 20 is viewable to the user.

The projection device is configured to project the image 34 (e.g., video feed) onto the receiver surface of the screen 24 of the viewing device. The screen 24 may include the rear projection material. The rear projection material is at least partially translucent and permits transmission of the image 34 (e.g., video feed) through the screen 24 from the receiver surface to the viewing surface 20 such that the image 34 is viewable on the viewing surface 20 to the user.

Moreover, the viewing device 14 may also include the focusing lens 30 configured to focus the image 34 (e.g., video feed) viewable on the viewing surface 20 such that the image 34 is viewable to the user wearing the viewing device 14. The focusing lens 30 may be arranged on the viewing device 14 to be positioned between the user and the viewing surface 20. In some embodiments, the image 34 includes a text-based message, a picture, a video, or some combination thereof. For example, the amusement park attraction may be a virtual reality type attraction such that the image 34 includes video images of the virtual reality environment. In another example, the image 34 may include text-based instructions for the amusement park attraction. The text-based instructions may inform the user on how to use the viewing device 14 to avoid losing the image 34 projected from the projection device.

Figure 7:
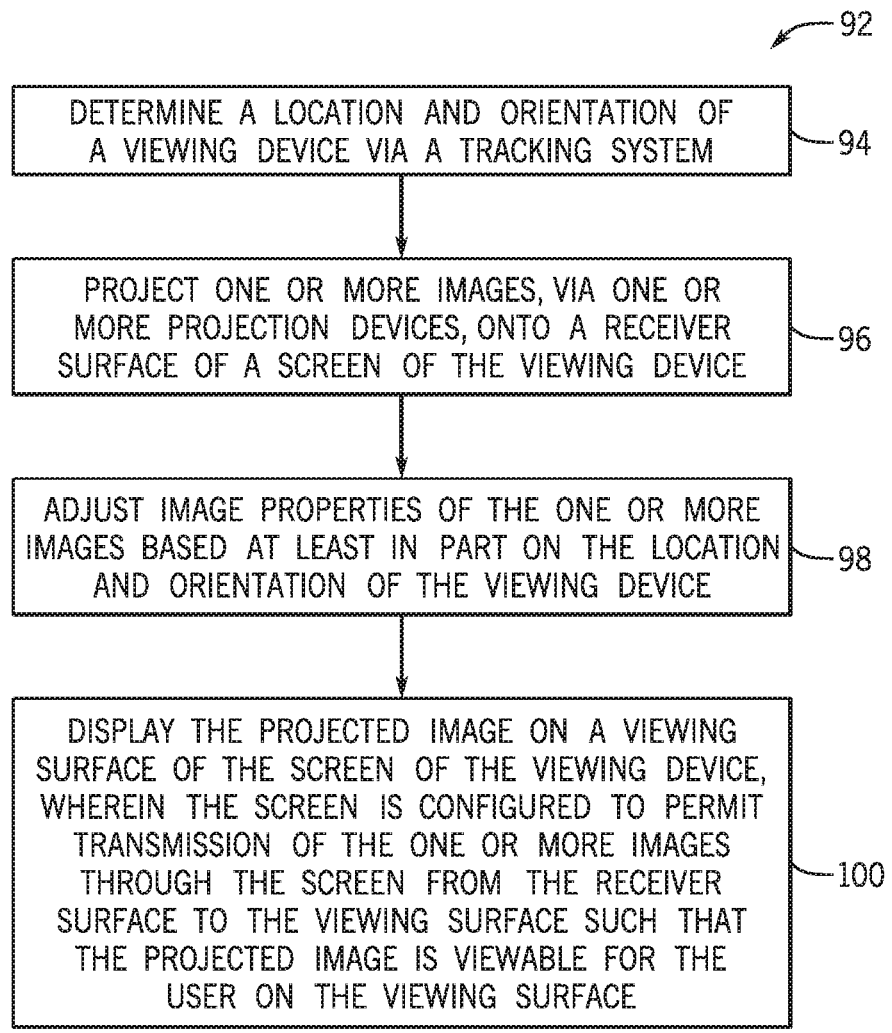
FIG. 7 is a flow chart of an embodiment of a method for viewing projected images from a projection device with a viewing device, in accordance with an aspect of the present disclosure.

FIG. 7 is a flow chart of an embodiment of a method 92 for viewing projected images from a projection device with a viewing device, in accordance with an aspect of the present disclosure. The method includes a step of determining a location and orientation of a viewing device via a tracking system (block 94), wherein the viewing device (e.g., glasses) is configured to be worn by a user and comprises a frame configured to hold the screen and a focusing lens.

The method further includes the step of projecting images, via one or more projection devices, onto a receiver surface of the screen of the viewing device (block 96). During an amusement park attraction, the user may move their head causing the viewing device to move with respect to a projected image output from the projection device. As such, the projected image may not be accurately displayed on the viewing device after the user moves their head. Thus, the method further includes the step of adjusting image properties of the images based at least in part on the location and orientation of the viewing device (block 98). For example, the user may shift in a seat of the amusement park attraction causing the viewing device to move to a new location and/or orientation (e.g., to the right). A control system may determine the new orientation and location of the viewing device and adjust the image properties (e.g., shift the image to the right) such that the projected image may be accurately displayed on the viewing device. In some embodiments, the method may include adjusting image properties such as a distortion, an offset, a scale, or any other suitable image properties.

The method further includes the step of displaying the projected image on a viewing surface of the screen of the viewing device, wherein the viewing surface is disposed opposite the receiver surface, wherein the screen is configured to permit transmission of the images through the screen from the receiver surface to the viewing surface such that the projected image is viewable to the user on the viewing surface through at least one focusing lens (block 100).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
 a projection device configured to project one or more images onto a receiver surface;
 a viewing device configured to be worn by a user and comprising a frame holding a screen and a focusing lens, wherein:
  the screen comprises the receiver surface and a viewing surface disposed opposite the receiver surface, and the screen is configured to permit transmission of the projected one or more images through the screen from the receiver surface to the viewing surface such that the projected one or more images are viewable on the viewing surface; and
  the focusing lens is configured to focus the projected one or more images viewable on the viewing surface for the user when wearing the viewing device; and
 a tracking system configured to determine a location and orientation of the receiver surface of the viewing device, wherein the projection device is configured to adjust image properties of the projected one or more images based at least in part on the determined location and orientation of the receiver surface.

2. The system of claim 1, wherein the image properties comprise a distortion, an offset, a scale, or some combination thereof.

3. The system of claim 1, wherein the viewing device comprises an infrared transceiver configured to output infrared location signals to the tracking system, wherein the tracking system is configured to receive the infrared location signals and determine the location and orientation of the viewing device based at least in part on the infrared location signals.

4. The system of claim 1, wherein the viewing device comprises a passive infrared tracking feature, wherein the tracking system comprises an infrared device configured to detect the passive infrared tracking feature and determine the location and orientation of the viewing device based at least in part on detection of the passive infrared tracking feature.

5. The system of claim 4, wherein the passive infrared tracking feature comprises an infrared ink pattern, infrared LED illuminators, or both.

6. The system of claim 1, wherein the tracking system comprises a camera configured to detect an optically visible tracking feature disposed on the viewing device, wherein the tracking system is configured to determine the location and orientation of the viewing device based at least in part on the detected optically visible tracking feature.

7. The system of claim 6, wherein the optically visible tracking feature comprises a retroreflective marker, QR codes, optically visible ink patterns, or some combination thereof.

8. The system of claim 1, wherein the viewing device comprises a global positioning system (GPS) device configured to output a GPS signal to the tracking system, and wherein the tracking system is configured to determine the location of the viewing device based at least in part on the GPS signal.

9. The system of claim 1, wherein the projection device is configured to project the one or more images based on image projection instructions received from a control system.

10. The system of claim 1, wherein the one or more images are configured to communicate a text-based message, a picture, a video, or some combination thereof.

11. The system of claim 1, comprising a reflective surface configured to reflect the projected one or more images onto the receiver surface of the screen of the viewing device.

12. The system of claim 1, comprising a projection device actuator configured to move the projection device based at least in part on the location and orientation of the viewing device.

13. The system of claim 1, wherein the tracking system is configured to determine changes in the location and orientation of the receiver surface of the viewing device relative to the one or more projection devices, wherein the one or more projection devices are separate from the viewing device and wherein the projection device is configured to adjust the image properties based on the determined changes in location and orientations.

14. The system of claim 1, wherein the screen comprises a rear projection material, wherein the rear projection material is translucent such that the projected one or more images are projected through the screen from the receiver surface to the viewing surface.

15. A method, comprising:
 determining a location and orientation of a viewing device via a tracking system, wherein the viewing device is configured to be worn by a user and comprises a frame configured to hold a screen and a focusing lens;
 adjusting image properties of one or more images, via one or more projection devices, based at least in part on the location and orientation of the viewing device; and
 projecting the one or more images, via the one or more projection devices, onto a receiver surface of the screen of the viewing device, wherein a viewing surface of the screen is disposed opposite the receiver surface, wherein the screen is configured to permit transmission of the one or more images through the screen from the receiver surface to the viewing surface such that the one or more images are viewable for the user on the viewing surface through the focusing lens.

16. The method of claim 15, wherein the image properties comprise a distortion, an offset, a scale, or some combination thereof.

17. The method of claim 15, wherein the viewing device comprises a passive infrared tracking feature, wherein the tracking system is configured to detect the passive infrared tracking feature and determine the location and orientation of the viewing device based at least in part on detection of the passive infrared tracking feature.

18. The method of claim 15, wherein the tracking system comprises a camera configured to detect an optically visible tracking feature disposed on the viewing device, wherein the tracking system is configured to determine the location and orientation of the viewing device based at least in part on the detected optically visible tracking feature.

* * * * *